UNITED STATES PATENT OFFICE.

PROSPER CARLEVARIS, OF TURIN, ITALY.

IMPROVED METHOD OF PRODUCING LIGHT.

Specification forming part of Letters Patent No. 56,336, dated July 10, 1866.

*To all whom it may concern:*

Be it known that I, PROSPER CARLEVARIS, professor of chemistry in the "Institut Technique Royal," of Turin, in the Kingdom of Italy, have invented a certain new and Improved Process of Producing a Powerful and Constant White Light, which may be employed in nocturnal photography, or used in light-houses or for general illuminating purposes; and I hereby declare the following to be a full, clear, and exact description of the same.

My new process is based on the following scientific principles: first, the infusibility of oxide of magnesium even at the highest temperature; second, the property of the same oxide of not becoming volatilized, except in a very slight degree, by the flame of oxidric gas or other gaseous combinations hereinafter mentioned; third, the property of the same oxide of giving, when introduced into the flame of oxidric gas or other gases hereinafter specified, a most powerful, steady, constant, and white light, which may be employed for nocturnal photography; fourth, the property possessed by the chloride of magnesium and the carbonate of magnesia of becoming reduced to a spongy oxide in the flame of the above-mentioned gas.

The three last properties are not only verified by the employment of oxidric gas, but also when use is made of a mixture of ordinary illuminating-gas in combustion with pure oxygen, or even of a mixture of ordinary illuminating-gas in combustion with a jet of atmospheric air in its ordinary state or oxygenated—that is to say, containing from one-half, one-third, one-fourth, to one-tenth of its volume of pure oxygen, which may be effected by passing it through a gasometer.

The light is obtained in accordance with the above principles in the following manner: A piece of chloride of magnesium or a prism of carbonate of magnesia is introduced in the flame of the oxidric or other gas, and is placed upon supports of lime, potters' earth, charcoal, gas-retort, or held by nippers tipped with platinum, fire-clay, &c. The salt is soon reduced to the state of a spongy oxide, and then a steady, constant, white, and very intense light will be obtained.

The light obtained by this process is surprisingly steady, and can be used for photographic purposes, in light-houses, and in general for every kind of illumination.

The gases which compose the oxidric gas—*i. e.*, oxygen and hydrogen, as likewise all the other combinations above named—may proceed separately from two different gasometers. When ordinary illuminating-gas is employed one of the gasometers may be dispensed with, the supply needed being taken directly from the ordinary gas-conduits. If the oxidric gas is made use of the two gases (oxgen and hydrogen) in their pure state can be prepared by any of the most economical processes, which are already too well known to need description.

Having now fully set forth the nature of my invention, what I claim, and desire to secure by Letters Patent, is—

The employment of chloride of magnesium and of the carbonate and other salts in general of magnesia reduced to an indecomposable state, as and for the purposes herein described, by being introduced in a flame composed of oxygen in combination with hydrogen or of such other gaseous compounds as are hereinabove set forth.

In testimony whereof I have signed my name to this specification before two subscribing witnesses.

PROSPER CARLEVARIS.

Witnesses:
  I. LORENZO RAIMONDO,
  G. VALERIO.